United States Patent [19]

Hill

[11] Patent Number: 4,468,304

[45] Date of Patent: Aug. 28, 1984

[54] ELECTRO CHEMICAL MACHINING METHODS

[75] Inventor: Christopher P. R. Hill, Olveston, Nr. Pilning, England

[73] Assignee: Rolls-Royce Limited, London, England

[21] Appl. No.: 573,313

[22] Filed: Jan. 24, 1984

[30] Foreign Application Priority Data

Feb. 10, 1983 [GB] United Kingdom ............... 8303656

[51] Int. Cl.³ ............................................. B23P 1/00
[52] U.S. Cl. ............................ 204/129.6; 204/129.7
[58] Field of Search ............... 204/129.7, 129.5, 129.6

[56] References Cited

U.S. PATENT DOCUMENTS

| | | | |
|---|---|---|---|
| 3,075,903 | 1/1963 | Costa et al. ...................... | 204/129.6 |
| 3,371,022 | 2/1968 | Inoue ............................. | 204/129.7 X |
| 3,399,125 | 8/1968 | Mikoshiba et al. ............... | 204/129.7 |
| 3,551,310 | 12/1970 | Inoue ............................. | 204/129.6 |
| 3,565,775 | 2/1971 | Brouchet et al. ............... | 204/129.7 X |

Primary Examiner—Donald R. Valentine
Attorney, Agent, or Firm—Parkhurst & Oliff

[57] ABSTRACT

Workpieces which are electrochemically machined, are exposed to corrosion and stray attack by the electrolyte, over surfaces which are not required to be machined. The invention provides a cowl 22 around the workpiece 10 and its fixture 12, a space 24 being provided at the plane of the interface between parts to be machined and parts not to be machined. De-ionized water is pumped into the interior of cowl 22, at a pressure just sufficient to prevent electrolyte entering gap 24, thus protecting the necessary workpiece portions and the apparatus.

8 Claims, 1 Drawing Figure

U.S. Patent   Aug. 28, 1984   4,468,304
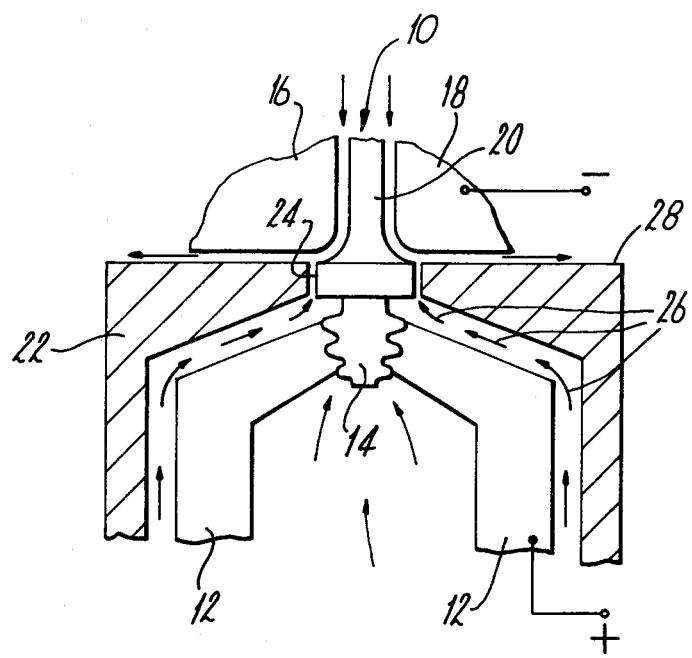

ELECTRO CHEMICAL MACHINING METHODS

This invention relates to an electro chemical machining process wherein an electrolyte is delivered between a workpiece and a machining electrode.

More specifically, the invention relates to a method of controlling the flow of electrolyte over the workpiece.

It is known, to mechanically shroud those parts of a workpiece which it is not required to electrochemically machine, in an attempt to avoid occurance of what is referred to as "stray attack" by the electrolyte.

It is also known to attempt to keep the electrolyte away from the aforementioned parts, by blowing air over them so as to provide a pneumatic barrier against electrolyte flow.

A further technique is the provision of sacrificial anodes, the function of which is well known.

The present invention seeks to provide an improved method of electrochemical machining.

According to the present invention, a method of electrochemically machining includes the steps of locating a workpiece in a fixture, enclosing the fixture and/or that part of the workpiece which it is not required to electrochemically machine in a cowl such that a peripheral space is provided therebetween and delivering a flow of water the maximum conductivity of which is about 300 mhos, to the peripheral space via the interior of the cowl at a pressure sufficient to prevent ingress of electrolyte.

Preferably the water is de-ionized and is delivered at a low flow rate so as to avoid interference with electrolyte flow over those workpiece surfaces which are to be machined.

The water may be delivered by a constant volume pump. Alternatively the water may be delivered by a small capacity, high pressure pump.

The invention will now be described by way of example and with reference to the accompanying drawing.

In the drawing, a workpiece 10 which in the present example is a compressor blade, is clamped by a pair of jaws 12 positioned on the firtree root 14 of blade 10.

A pair of forming electrodes 16, 18 are arranged to approach that part 20 of blade 10 which will be the aerofoil, so as to enable electro chemical machining of the aerofoil 20 in a known manner.

A cowl 22 surrounds that portion of blade 10 which is not required to be machined, in spaced relationship, the space 24 being small.

When machining commences, a flow of electrolyte is provided between electrodes 16, 18 and blade 10 and simultaneously a flow of de-ionized water is directed to the interior of cowl 22 as indicated by arrows 26. The de-ionized water pressure is such as to prevent the ingress of electrolyte in and through space 24. It is not so great however, as to disturb the flow of electrolyte over the aerofoil 20 of blade 10.

Both flows meet in the plane of the upper face 28 of the cowl 22 and flow sideways as viewed in the drawing, to drains (not shown).

The appropriate relative flow rates of the electrolyte and the de-ionized water, is achieved by delivering the latter from a low flow rate constant volume pump which avoids the necessity for pressure sensors in space 24 and associated complicated pressure adjusting apparatus. However, a small capacity, high pressure pump could be substituted therefor.

Water, the conductivity of which is about 300 mhos maximum, may be substituted for the de-ionized water. In addition, tap water may be used.

It will be seen from the foregoing description, that stray electrolyte attack on the portions of blade 10 which are within cowl 22, is prevented, as is the corrosive effects of the salts in the electrolyte. Further advantages which are derived from the invention, are that (a) fluid lost from the electrolyte be evaporation, is replaced by the de-ionized water, (b) secrificial biasing anodes normally fitted to the fixture, may be obviated by virtue of the de-ionized water acting as an electrical insulater, (c) cooling is provided for the fixture and lower part of the blade 10, (d) further debris flushing is provided, and (e) preventing electrolyte entry to the cowl considerably eases internal washing.

I claim:

1. A method of electrochemically machining a workpiece including the steps of locating the workpiece in a fixture, enclosing the fixture and/or that part of the workpiece which is not required to be machined in a cowl such that a peripheral space is provided therebetween, and delivering a flow of water the maximum conductivity of which is about 300 micro mhos, to the peripheral space via the interior of the cowl, at a pressure sufficient to prevent ingress of electrolyte.

2. A method of electrochemical machining as claimed in claim 1 including the step of delivering the water at a low flow rate so as to avoid interference with electrolyte flow over those workpiece surfaces which are to be machined.

3. A method of electrochemical machining as claimed in claim 1 including the step of delivering the water from a constant volume pump.

4. A method of electrochemical machining as claimed in claim 1 including the step of delivering the water from a small capacity, high pressure pump.

5. A method of electro chemical machining as claimed in claim 3 wherein the water is tap water.

6. A method of electrochemical machining as claimed in claim 4 wherein the water is tap water.

7. A method of electrochemical machining as claimed in claim 5 wherein the water has been de-ionized.

8. A method of electro chemical machining as claimed in claim 6 wherein the water has been de-ionized.

* * * * *